US007080462B2

(12) United States Patent
Nickell

(10) Patent No.: US 7,080,462 B2
(45) Date of Patent: Jul. 25, 2006

(54) STRUCTURAL FRAMEWORK DETAILING TOOL

(76) Inventor: Joe A Nickell, 2706 E. Linwood Ave., Turlock, CA (US) 95380

( * ) Notice: Subject to any disclaimer, the term of this patent is extended or adjusted under 35 U.S.C. 154(b) by 23 days.

(21) Appl. No.: 10/889,697

(22) Filed: Jul. 12, 2004

(65) Prior Publication Data

US 2006/0005414 A1 Jan. 12, 2006

(51) Int. Cl.
*B43L 7/12* (2006.01)
*G01B 3/14* (2006.01)

(52) U.S. Cl. .......................................... 33/645; 33/562

(58) Field of Classification Search .................. 33/645, 33/415, 416, 417, 418, 419, 423, 427, 464, 33/613, 562, 566
See application file for complete search history.

(56) References Cited

U.S. PATENT DOCUMENTS

| | | | | |
|---|---|---|---|---|
| 584,190 | A * | 6/1897 | Parkhill | 33/416 |
| 1,389,556 | A * | 8/1921 | Winn | 33/417 |
| 1,925,708 | A * | 9/1933 | Wheeler | 33/418 |
| 1,983,516 | A * | 12/1934 | Ahola | 33/419 |
| 2,580,263 | A * | 12/1951 | Wooten | 33/419 |
| 4,914,822 | A * | 4/1990 | Wetherington | 33/562 |
| 5,446,969 | A * | 9/1995 | Terenzoni | 33/419 |
| 5,472,029 | A * | 12/1995 | Ketch | 33/418 |
| 6,260,283 | B1 * | 7/2001 | Abernathy et al. | 33/419 |

* cited by examiner

*Primary Examiner*—Christopher W. Fulton
(74) *Attorney, Agent, or Firm*—Thomas R. Lampe

(57) ABSTRACT

A structural detailing tool including relatively movable first and second blades disposed at right angles to one another and both incorporating straight edges used as tracing guides. Lock structure is employed to lock the blades in different relative positions and a movable tray is mounted on one of the blades to support a calculator and a data card.

4 Claims, 4 Drawing Sheets

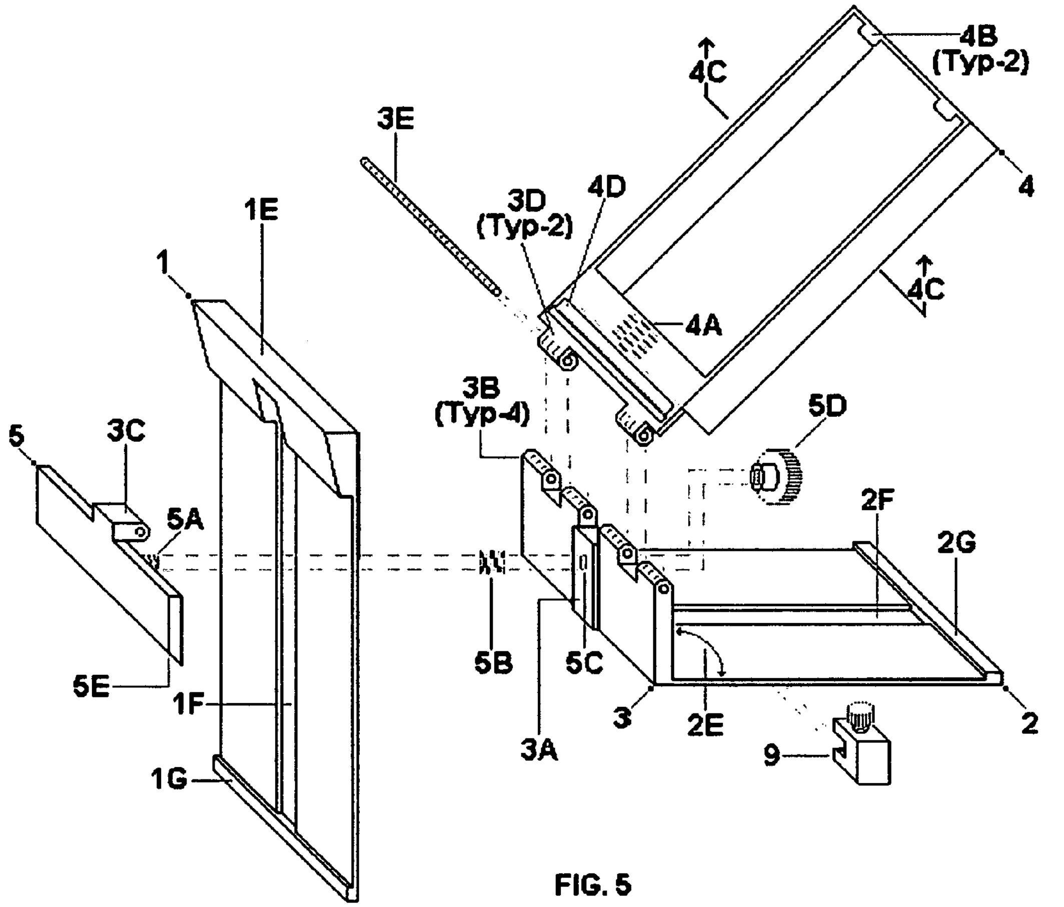

FIG. 5

PARTS LEGEND

1 .. VERTICAL BLADE
1E .. END CAP
1F .. GUIDING SLOT
1G .. END STAY
2 .. HORIZONTAL BLADE
2E .. RIGHT ANGLE
2F .. SLOT
2G .. END STAY
3 .. MANIFOLD
3A .. GUIDE BLOCK
3B .. HINGE KNUCKLE
3C .. HINGE KNUCKLE
3D .. HINGE KNUCKLE
3E .. HINGE PIN
4 .. FLIP-UP CALCULATOR TRAY
4A .. COMPRESSION SPRING
4B .. CALCULATOR RETAINING CLIP
4C .. CALCULATOR TRAY BACKSIDE
4D .. DATA CARD RETAINING CLIP
5 .. FACE CLAMP
5A .. THREADED STUD
5B .. Ø KNURLED NUT
5C .. COMPRESSION SPRING
5D .. Ø HOLE
5E .. 45° BEVEL
8 .. CALLOUT DATA CARD
9 .. STOP GAUGE, (by others)

FIG. 6

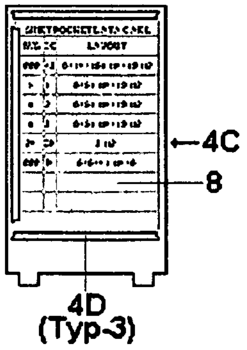

FIG. 7

STRUCTURAL FRAMEWORK DETAILING TOOL

PRIOR APPLICATIONS

Not Applicable

FEDERALLY SPONSORED

Not Applicable

REFERENCE TO SEQUENCE LISTING A TABLE

Not Applicable

BACKGROUND OF THE INVENTION

1. Field of the Invention

My invention relates generally to a detailing tool with straight edges, aiding the user in marking out for the placement of components in the fabrication of a buildings framework.

2. Description of the Prior Art

A person can use various tools to aide in accomplishing these markings, reference is made to Butcher et al. U.S. Pat. No. 5,456,015, Miller, U.S. Pat. No. 4,574,492, and Hennessey, U.S. Pat. No. 4,361,964, these are wrap around type tools with edges for marking, with some engraved measurement calibrations detailing data on adjacent work piece surfaces of structural building components.

Further searches of the U.S. Pat. No's.

| | | | | |
|---|---|---|---|---|
| 6,694,633 | 5,170,568 | 4,697,351 | 3,950,857 | 1,139,229 |
| 6,272,758 | 5,140,755 | 4,654,978 | 3,823,481 | 1,135,259 |
| 6,049,990 | 5,113,596 | 4,607,438 | 3,456,353 | 855,987 |
| 5,974,677 | 5,090,129 | 4,574,492 | 3,439,426 | 387,966 |
| 5,669,149 | 5,077,910 | 4,503,624 | 3,183,596 | 74,297 |
| 5,388,340 | 4,967,482 | 4,499,666 | 3,169,320 | RE 380,32 |
| 5,367,783 | 4,944,096 | 4,429,466 | 2,965,969 | |
| 5,337,487 | 4,745,689 | 4,420,891 | 1,732,906 | |
| 5,253,426 | 4,742,619 | 4,227,314 | 1,665,400 | |
| 5,239,762 | 4,712,304 | 4,212,108 | 1,257,683 | |

disclose different devices aiding the user in marking out location and measurements for structural component fabrication. Layout tools incorporating, or providing means for attaching a measuring tape are disclosed, If measurements, other than progressive compilation is required, this becomes disadvantageous.

BRIEF SUMMARY OF THE INVENTION

None of my searches have disclosed a hand held tool with means for the attachment of a mechanism for compiling progressive measurements, computing angular measurements and computing innumerable degrees, while using the same hand held tool as an aide of the delineation application of these results. Neither do they disclose a means for attaching cards with called for construction data. Presently, to keep a card with pertinent data at hands reach, and keep breezes from disturbing it, it is clipped to a clipboard, weighted down, or put in the users pocket, requiring multiple movements when progressing along the work piece detailing for fabrication.

My objective is, providing a one-handed held tool to aide the user in the marking and detailing of called for data, and performing calculations in a more productive manner throughout completion of the fabrication of a building.

My invention is a wrap around type device with flat, right angled, blades projecting outward from each other. One blade is an adjustable vertically oriented, slid able blade used in marking out component location on the narrow sides of multiple work pieces, or the wide side of a singular work piece, and is directed to a locking type measuring tape laying on the surface plane of the working place, contiguous to the work piece, said blade being guided, and adjusted in height, at the 90° turned-up end embodiment of a horizontally oriented blade, this blade used in marking out the adjacent work piece side with component placement location, size and description data. The turned-up end embodiment provides a calculator holding tray, with means for attaching indexed data cards to tray's face and backside. The placement of the measuring tape on the surface plane of the working place in a locked position, permits the user to progress along the work piece making markings at varying distances, or if necessary, retrace data, the user needs only the invention and marking instruments at hand to carry out the procedure.

BRIEF DESCRIPTION OF THE DRAWINGS

FIG. 5 Isometric view showing tool parts.

FIG. 6 Parts Legend

FIG. 7 An elevation view showing the backside of the calculator holding tray.

DETAILED DESCRIPTION OF THE INVENTION

Referencing my invention, it is used as an aide in the tracing out of perpendicular markings on a structural work piece necessary for the segmented placement and connection of components in the fabrication of a Buildings framework, the work piece described as a linear length of material, or linear lengths stacked, upon the surface plane of the working place, said working place described as saw horses, staging, a bench, or the buildings floor. Laying out and detailing for the fabrication of a building's wall assembly is referenced with drawings. The basic components of a wall, are the top and bottom plates, described as work pieces, plate to plate uprights called studs, cut up-rights called cripples, spacing to receive beams called beam pockets, backing for the connection of intersecting walls midway of wall length called channels, backing at the walls end for connecting to an adjacent wall is called corner, a lintel above an opening called a header, a lintel below an opening called sub sill, an up-right at a header end called king stud, and an up-right support at a header end called end cripple or trimmer. A wall with a raking top, the component description of top plate, or vertical components contiguous with said plate, the word rake precedes the description, i.e., rake plate, rake stud, rake cripple.

The most common material thickness in wood construction is a nominal thickness of 2 inches, sized to an actual dry dimension of 1½ inches, the second commonly used material is a nominal thickness of 4 inches, sized to 3½ inches dry.

Figure 1:
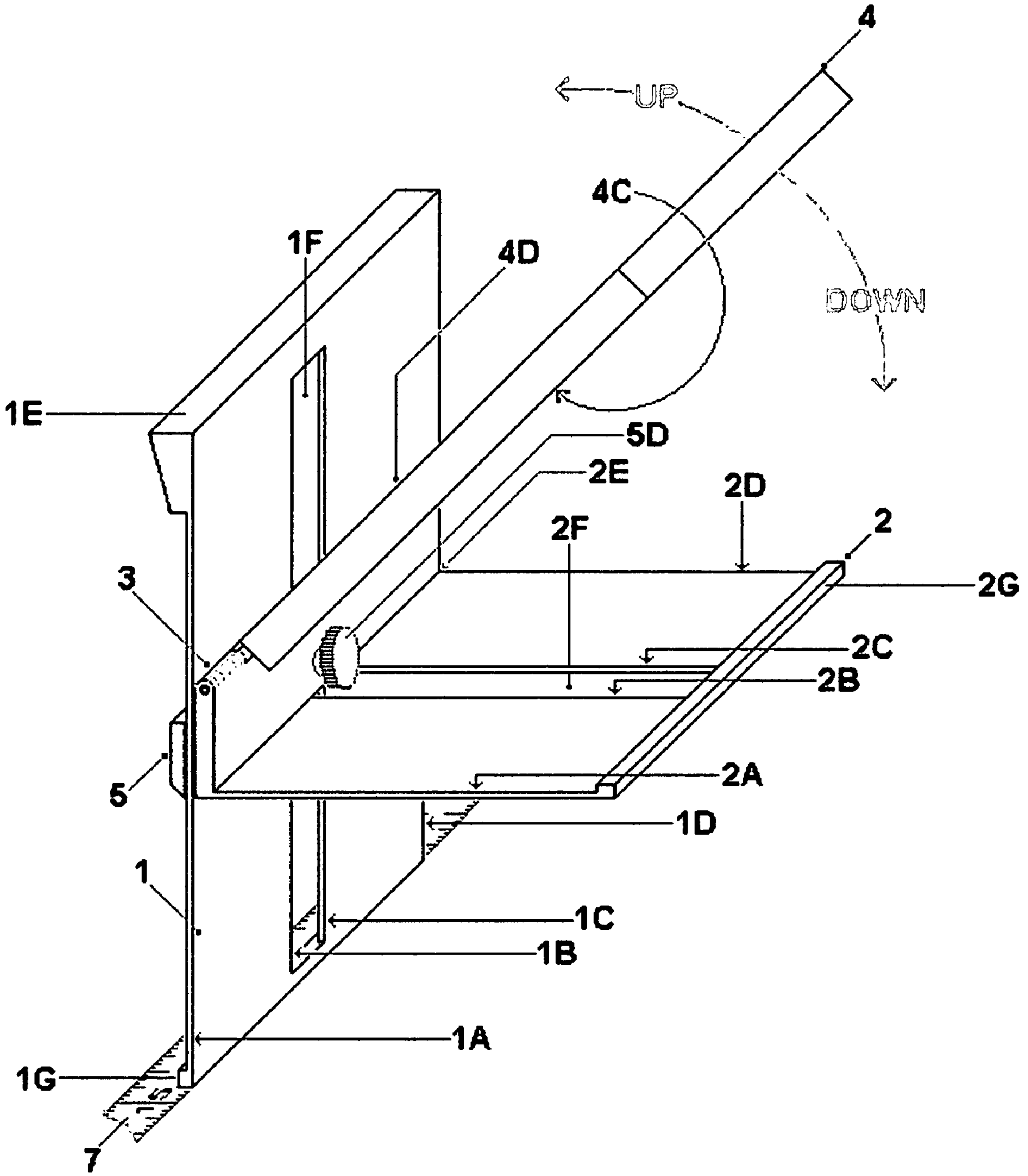
FIG. 1 An isometric left rear view showing movement directions and controls, FIG. 2 An isometric view showing the tool with blade directed to a measuring tape.

Referenced in FIG. 1, the detailing tool with the interior face of the horizontal blade, 2, facing down, loosening the knurled nut, 5B, permits vertical adjustment of blade 1 from ⅜ inches to 6 inches, enabling making markings on sides of multiple plates. A flip-up tray, 4, for holding a calculator, with means for attaching cards to the face and backside of said tray, with data from working drawings and specifications. Blades, 1 and 2 have paralleling straight edges, 1A, 1B, 1C, and 1D, sequentially aligned with 2A, 2B, 2C, AND 2D. The distance spacing of the straight edges, measure 1½ inches from 2A to 2B, 1½ inches from 2C to 2D and 3½ inches from 2A to 2D. The blades have ⅜ inch end stays, 1F & 2F, end 1F has engraved delineations at edges 1B and 1C, and at center locations between these straight edges. These edges and said delineations are aligned with dimensioned delineations of the measuring tape, 7, for marking distances and component sizes.

Figure 2:
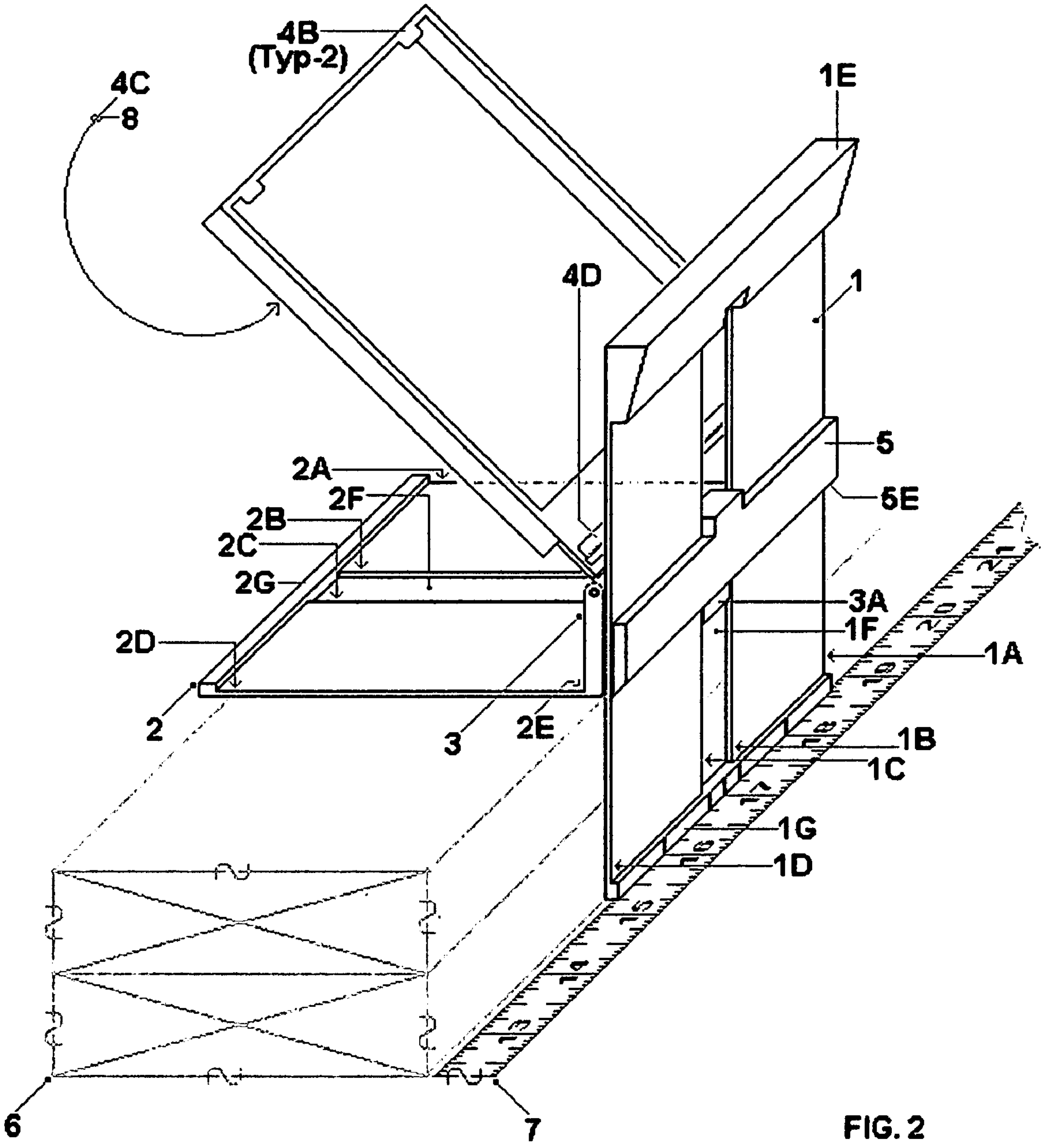

Referenced in FIG. 2, the detailing tool atop the work piece, 6, comprised of 2 plates stacked on the surface plane of the working place. At the start end of the work piece, markings are made tracing selected straight edges of the detailing tool, on the adjacent exposed surfaces, for the placement of the end component, and detailing descriptive data of the component on the top surface of the work piece. A measuring tape, 7, is placed contiguously the length of the work piece, with the tapes end aligned with the start end of the work piece. The tool is moved to the next, nearest, component location with the selected edge of blade 1 directed to the measuring tape and positioned at the called for dimension distance, repeating the procedure of tracing out for the placement location and detailing called for data. Progression is made along the work piece in this manner, using the on-board mechanized calculator in compiling segmented measurements, performing calculations for angular measurements, and detailing data from the data card, 8, to the opposite work piece end.

Figure 3:
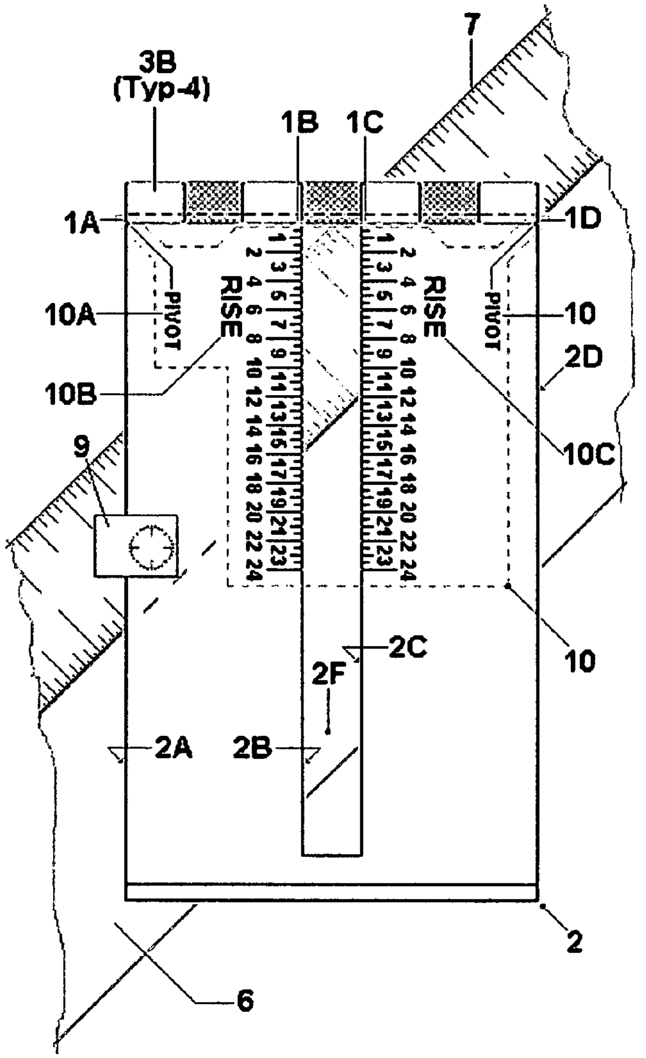
FIG. 3 A plan view of the horizontal oriented blade with engraved delineations showing pivot point locations and pitch calibrations.
Figure 4:
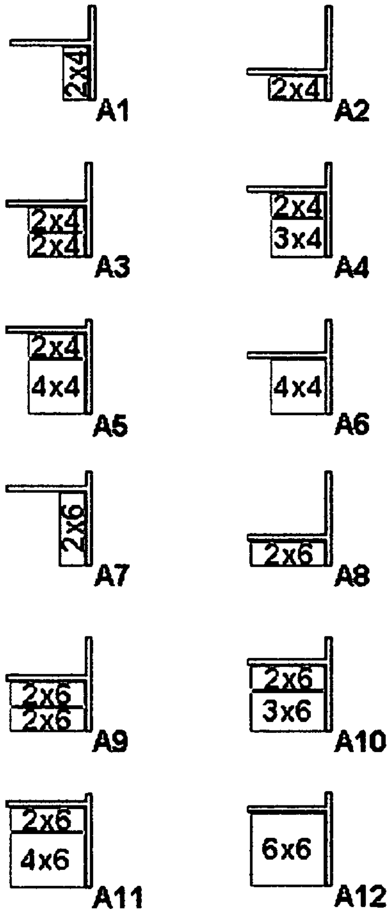
FIG. 4 End views showing the use procedure of different component configurations of some commonly used materials, sequentially shown as A1 through A12.

Referenced in FIG. 3, the detailing tool, with engraved delineations of blade 2 visually exposed, placed atop the work piece, 6. a single rake plate. At the left work piece end, using the right portion of the tool, the pivot indicator, 10D, and the rise, 10C, calibration numeral 12, is aligned with the outer edge of the work piece, an alignment guide, 9, is tightly attached to edge 2A contiguous with said work piece edge. Tracing along edge 2D, and edge 1D of the vertical blade, making a cut mark, this cut location becomes the start position of measuring tape, 7, resting on the working place surface, pulled in a left to right direction. When the pull direction is from right to left guide 9 is attached to edge 2D, the edges and engraved delineations of the left portion of the tool are used. Move the tool with the selected edge of blade 1 directed to the measuring tape and positioned at the called for dimensioned distance to the next, nearest, component location, repeat the procedure of tracing out for the placement location and detailing called for data. Proceed along the work piece in this manner, detailing called for data, and compiling the progressive segmented measurements, performing calculations for angular measurements with the on-board mechanized calculator.

The invention claimed is:

1. A detailing tool used when fabricating building frameworks or other structural assemblies comprising, in combination:

a first blade having a plurality of first blade straight edges used as tracing guides for laying out markings on one or more workpieces and having a substantially planar first blade surface located between said first blade straight edges;

a second blade having a plurality of second blade straight edges used as tracing guides for laying out markings on one or more workpieces and having a substantially planar second blade surface located between said second blade straight edges, said second blade being mounted on said first blade and selectively movable relative to said first blade along the first blade substantially planar surface whereby the distance between said second blade and said first blade straight edge is varied, with the substantially planar first and second guide surfaces being disposed orthogonally with respect to one another;

lock structure operatively associated with said first and second blade to lock said second blade against movement relative to said first blade at selected positions on said first blade; and a support tray having a calculator support surface and a data card support surface, said support tray being pivotally mounted on said second blade and selectively movable between a generally vertical orientation and a generally horizontal orientation.

2. The tool according to claim 1 wherein two spaced straight edges of said first plate define sides of an elongated opening in said first plate, said lock structure comprising clamp structure extending through said elongated opening.

3. The tool according to claim 2 wherein the straight edges of a pair of spaced straight edges of said second plate define an elongated opening in said second plate.

4. The tool according to claim 1 wherein one of said first blade straight edges has a measuring tape engagement surface for selective engagement with a measuring tape and for extending along the measuring tape.

* * * * *